United States Patent [19]
Grumbles

[11] Patent Number: 5,107,564
[45] Date of Patent: Apr. 28, 1992

[54] LEAF GATHERING AND BAGGING SYSTEM

[76] Inventor: Carl E. Grumbles, 5 W. Bigelow Oaks Ct., Woodlands, Tex. 77380

[21] Appl. No.: 643,229

[22] Filed: Jan. 22, 1991

[51] Int. Cl.$^5$ .................. A47L 13/52; B65B 67/04
[52] U.S. Cl. ........................ 15/257.1; 15/257.4; 15/257 R; 15/405; 248/97; 248/101
[58] Field of Search ............... 15/257.1, 257.3, 257.4, 15/257 R; 248/97, 99, 101; 141/391, 108; 294/1.1; 193/30; 24/20 S

[56] References Cited

U.S. PATENT DOCUMENTS

| | | | |
|---|---|---|---|
| 2,730,612 | 1/1956 | Westendorf | 24/20 S |
| 3,936,087 | 2/1976 | Alexander | 15/257.1 |
| 4,312,531 | 1/1982 | Cross | 15/257.1 |
| 4,376,520 | 3/1983 | Wetherington | 248/97 |
| 4,488,697 | 12/1984 | Garvey | 248/101 |
| 4,650,221 | 3/1987 | Caillouet, Jr. | 24/20 S |
| 4,657,284 | 4/1987 | Fiori | 24/20 S |
| 4,757,966 | 7/1988 | Harris | 248/97 |
| 4,889,622 | 12/1989 | Newcombe-Bond | 15/1.7 |

Primary Examiner—Harvey C. Hornsby
Assistant Examiner—Reginald L. Alexander
Attorney, Agent, or Firm—Richard C. Litman

[57] ABSTRACT

Disclosed is a leaf gathering and bagging system. The leaf gathering device comprises a mesh basket having a circumferential bump ring thereon, and two extendable legs cooperating with the mesh basket to guide leaves and other debris into the basket, the leaves and other debris being driven by a hand-held blower. The bag holder comprises a bump ring designed to cooperate with the basket bump ring, a cylindrical portion integral with the bag holder bump ring, and a retainer ring mounted on the cylindrical portion to retain a bag, which may be plastic, in an upright and open position. The cylindrical portion has three sockets thereon for slidably receiving three tripod legs. The bag holder and the extendable legs may be compactly stored in or on the mesh basket. The system provides an arrangement for first gathering leaves and other debris in the basket and thereafter provides for the transfer of the leaves and other debris to a bag ready for disposal.

2 Claims, 3 Drawing Sheets

LEAF GATHERING AND BAGGING SYSTEM

FIELD OF THE INVENTION

This invention relates to a device for gathering leaves and similar debris coupled with a means for bagging the collected leaves and similar debris.

BACKGROUND OF THE INVENTION

A number of leaf gathering and bagging devices are known. U.S. Pat. No. 3,638,888 issued to John A. Ross, U.S. Pat. No. 3,866,872 issued to Lloyd Eugene Burgess, and U.S. Pat. No. 4,757,966 issued to John A. Harris disclose leaf bag holders which are capable of holding a plastic bag upright and open whereby leaves and other debris may be manually inserted into the plastic bags.

Similarly, U.S. Pat. No. 3,936,087 issued to William R. Alexander, U.S. Pat. No. 3,942,832 issued to Donald A. Hass, Jr., U.S. Pat. No. 4,434,829 issued to Robert L. Barnard, U.S. Pat. No. De. 4,768,742 issued to Edward P. Kaaloa, U.S. Des. Pat. No. Des. 267,593 issued to Brian F. Crawford and U.S. Des. Pat. No. Des. 299,075 issued to Menzy Scott disclose arrangements for holding a plastic bag open whereby leaves and other debris may be raked or swept into the open bag.

Each of the above-cited patents require manual handling of the leaves and other debris in order to insert such debris. To get away from manual handling of such debris, U.S. Pat. No. 4,713,858 issued to John D. Kelber discloses an arrangement comprising a blower-vacuum device connected to a trash can or the like by means of an elongated hose or tube and a covering shroud or skirt mounted on the trash can or the like. The area covered by the Kelber device is limited by the length of the hose, thereby requiring frequent movement of the trash can.

SUMMARY AND OBJECTS OF THE INVENTION

The inventive device comprises a V-shaped funneling means or legs inserted into a mesh leaf basket for the purpose of directing leaves and other debris into the mesh leaf basket by a conventional electric or gasoline-powered blower. It is contemplated that the basket diameter would be approximately 18 inches in diameter and 36 inches high. The length of the V-shaped legs are approximately 60 inches in length and formed of four separable pieces of semi-cylindrical form which may have a 17½ inch diameter at the basket end. The configuration of the legs is such that a vortex is created by the blower which lifts the leaves and other debris from the ground, allowing the blower to move the leaves and other debris into the mesh leaf basked with a sweeping-like action. The mesh basket is provided with an external circumferential "bump" ring which cooperates with a bag holder bump ring to jar leaves or other debris loose during transfer of the leaves or other debris from the mesh basket to a plastic bag. At their outer ends the legs are provided with spikes which may be pushed into the ground to provide stability to the legs during operation of the blower.

The separate bag holder comprises a bump ring having a central opening of sufficient size to permit the top of the mesh leaf basket to be inserted therein until the bump ring on the mesh basket engages the bump ring of the bag holder. A cylindrical portion integral with the bag holder bump ring has three openings therein allowing three legs of a tripod to be inserted therein. The bag holder also includes a bag retainer ring which may be spread open by pulling on diametrically opposed handles against a spring bias. After the open end of a plastic bag is lapped over the bump ring of the bag holder the bag retainer ring is slipped over the bump ring and onto the cylindrical portion to grip the bag against the bump ring. The bump ring of the bag holder may include friction grooves to help retain the plastic bag on the bag holder.

To store the leaf gathering and bagging device the funnel legs may be separated and stored in the mesh basket along with the tripod legs. The bag holder ring and the bag retainer ring may be mounted on the bump ring surrounding the mesh basket.

It is an object of this invention to provide a leaf gathering and bagging device wherein leaves and other debris may be accumulated and bagged without raking or manual handling of the leaves or other debris.

It is a further object of this invention to provide a leaf gathering and bagging device which may be compactly stored when not in use.

It is another object of this invention to provide a leaf gathering and bagging device which is economical to manufacture, can be set up in a short period of time, and is easy to use.

Other objects, features and advantages of this invention will be apparent from the following detailed description and the appended claims, reference being had to the accompanying drawings forming a part of the specification, wherein like reference numerals designate corresponding parts of the several views.

DETAILED DESCRIPTION OF A PREFERRED EMBODIMENT

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein are for the purpose of description and not limitation.

Figure 1:
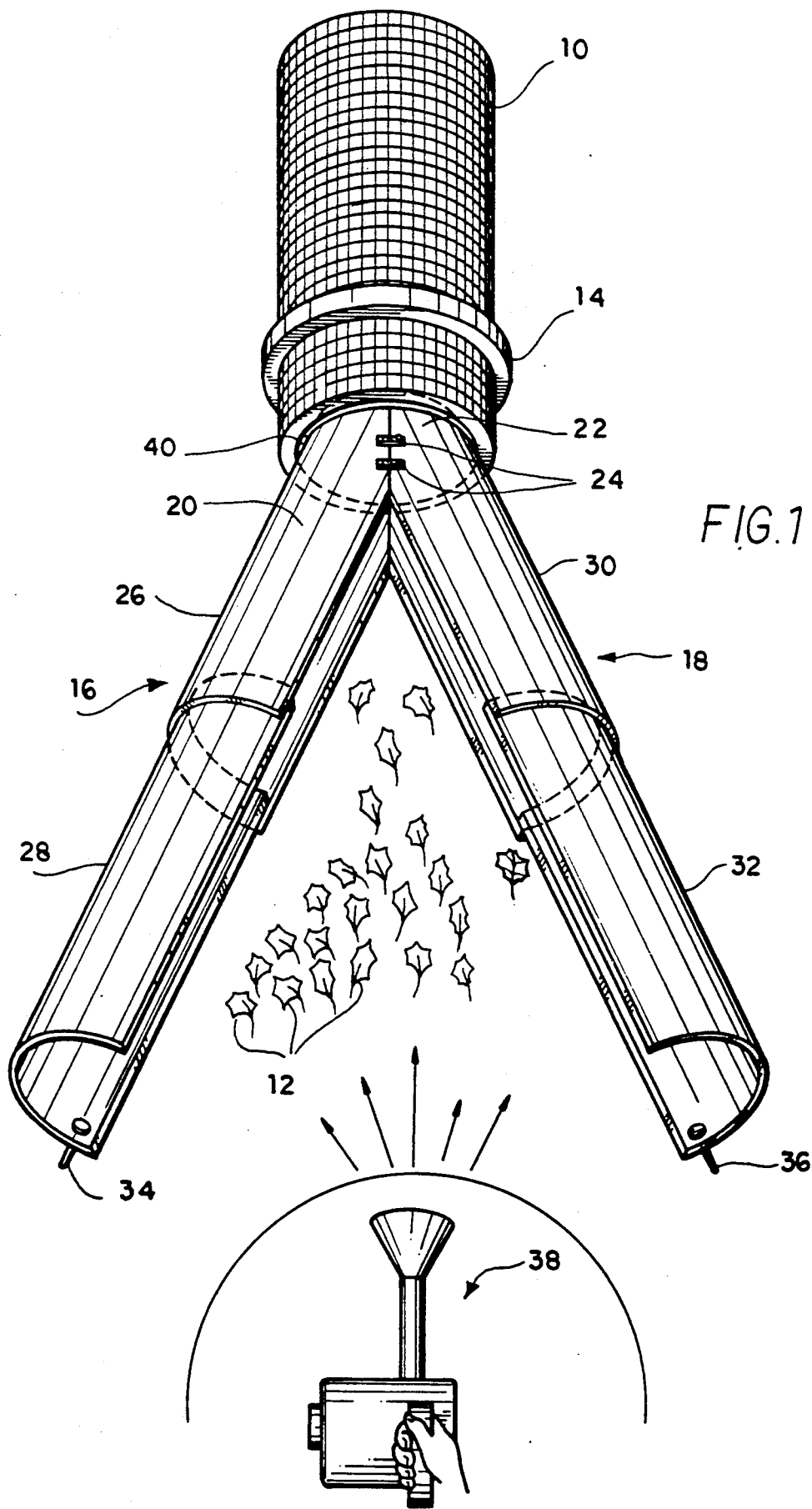
FIG. 1 is a perspective view showing the relationship between a mesh leaf basket, funneling legs and a powered blower.

In FIG. 1, there is shown a mesh basket 10 for collecting leaves 12 and other debris. Basket 10 is formed with an open mesh so as to allow blown air to pass through the basket 10 while retaining the leaves 12 and other debris therein. Circumferentially of the basket 10 is formed a bump ring 14 located near the top of the basket 10 for a purpose to be described later.

The size of the basket and the parts cooperating therewith may be varied. In one working model, basket 10 has a diameter of 18 inches and a length of 36 inches.

Inserted into the mouth 40 of the mesh basket 10 to form a V-shaped funnel are a pair of extendable legs 16 and 18 each having integral therewith a cover portion 20 and 22, respectively, connected together by any conventional quickrelease fastening means 24. Leg 16 is formed into two parts, an upper leg portion 26 and a lower leg portion 28 telescopically slidable within the upper leg portion 26. Similarly, leg 18 is formed of an upper leg portion 30 and a lower leg portion 32 telescopically slidable within the upper leg portion 30. Attached to each lower leg portion 28 and 32, respectively, is a spike 34 and 36 which may be driven into the ground to retain the respective legs 16 and 18 in position when in use. In the working model, each cover portion 20 and 22 has a diameter of 17½ inches at the end entering mesh basket 10 so as to provide a snug fit within the mouth 40 of the mesh basket 10.

Also shown in FIG. 1 is a conventional hand-held electric or gasoline-powered blower 38 which in use provides a flow of high velocity air creating a vortex which through a sweeping action by the operator lifts and blows leaves 12 and other debris into basket 10, guided by the funneling action of legs 16 and 18.

Figure 2:
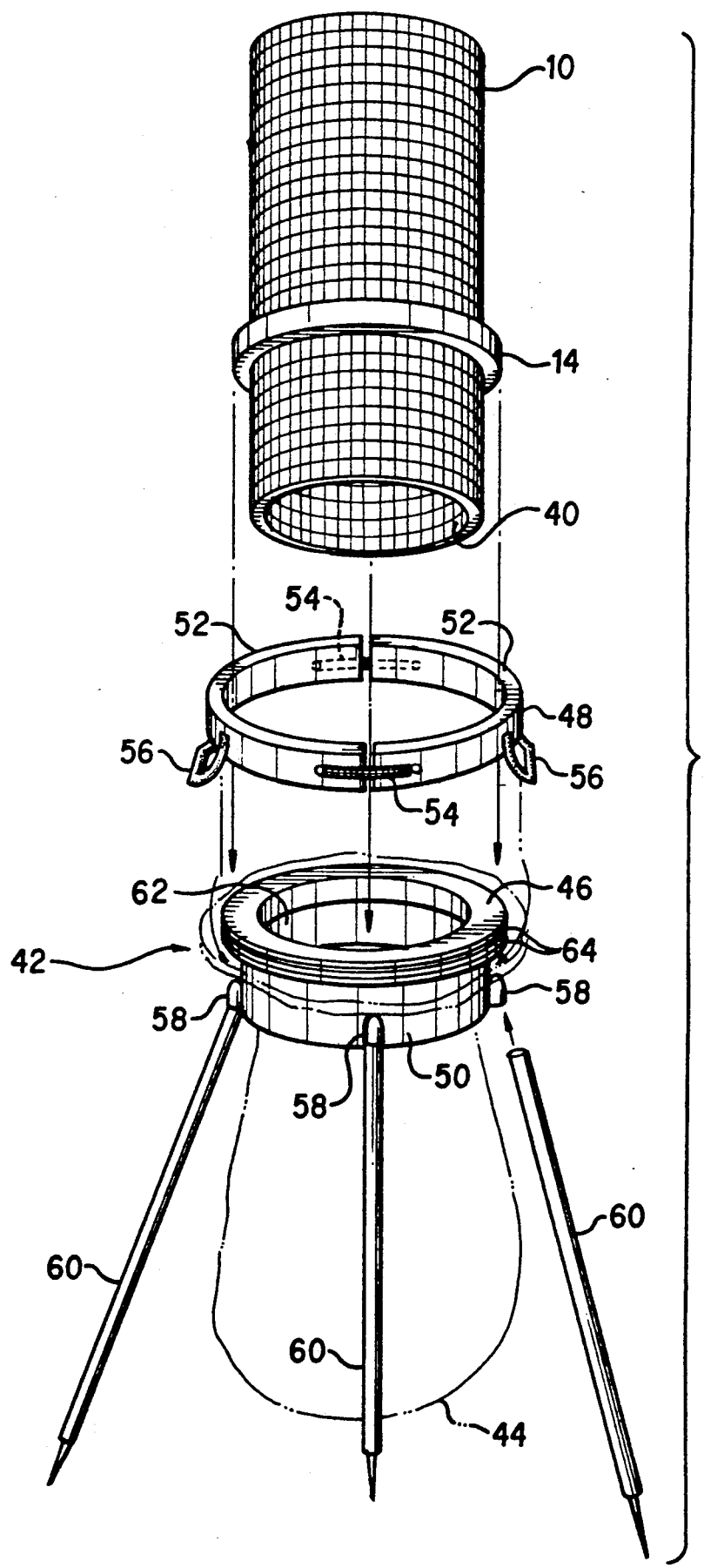
FIG. 2 is an exploded perspective view showing the relation between the mesh leaf basket and a plastic bag holder.

FIG. 2 shows plastic bag holder 42 which cooperates with mesh basket 10 to enable the transfer of leaves 12 or other debris from basket 10 to plastic bag 44 carried by holder 42. Bag 44 overlaps a bump ring 46 disposed at the top of holder 42 and is held in place by a retainer ring 48 which engages a cylindrical portion 50 of the holder 42 to hold the bag 44 in place. Retainer ring 48 comprises two halves 52,52 held together by tension springs 54, 54 as shown. The retainer ring halves 52,52 may be separated by pulling on handles 56 against the bias of springs 54. Thereafter retainer ring 48 is slipped over bump ring 46 to clamp the top of bag 44 against cylindrical portion 50 of holder 42 to hold bag 44 in an upright open position. If found to be desirable, bump ring 46 may be provided with circumferential friction grooves 64 to help retain the bag 44 in position.

Holder 42 further comprises at least three sockets 58 for slidably receiving three tripod legs 60 which support holder 42. Legs 60 provide sufficient clearance for holder 42 above ground level to allow easy access to plastic bag 44.

The diameter of opening 62 in bump ring 46 and cylindrical portion 50 is designed to be slightly larger than the outside diameter of mesh basket 10. When mesh basket 10 is filled with leaves 12 and other debris, it becomes necessary to empty basket 10 into another container such as plastic bag 44. As shown in FIG. 2, basket 10 is inverted, and the top portion of basket 10 is lowered into the opening 62 in bag holder 42 until bump ring 14 engages bump ring 46. Thereafter bump ring 14 may be repeatedly bumped against bump ring 46 to help dislodge leaves 12 or other debris which may be caught in basket 10 during transfer of leaves 12 or other debris to plastic bag 44. When bag 44 is full, retainer ring 48 is removed, allowing bag 44 to be removed from cylindrical portion 50 and a new bag 44 to be mounted in holder 42.

Figure 3:
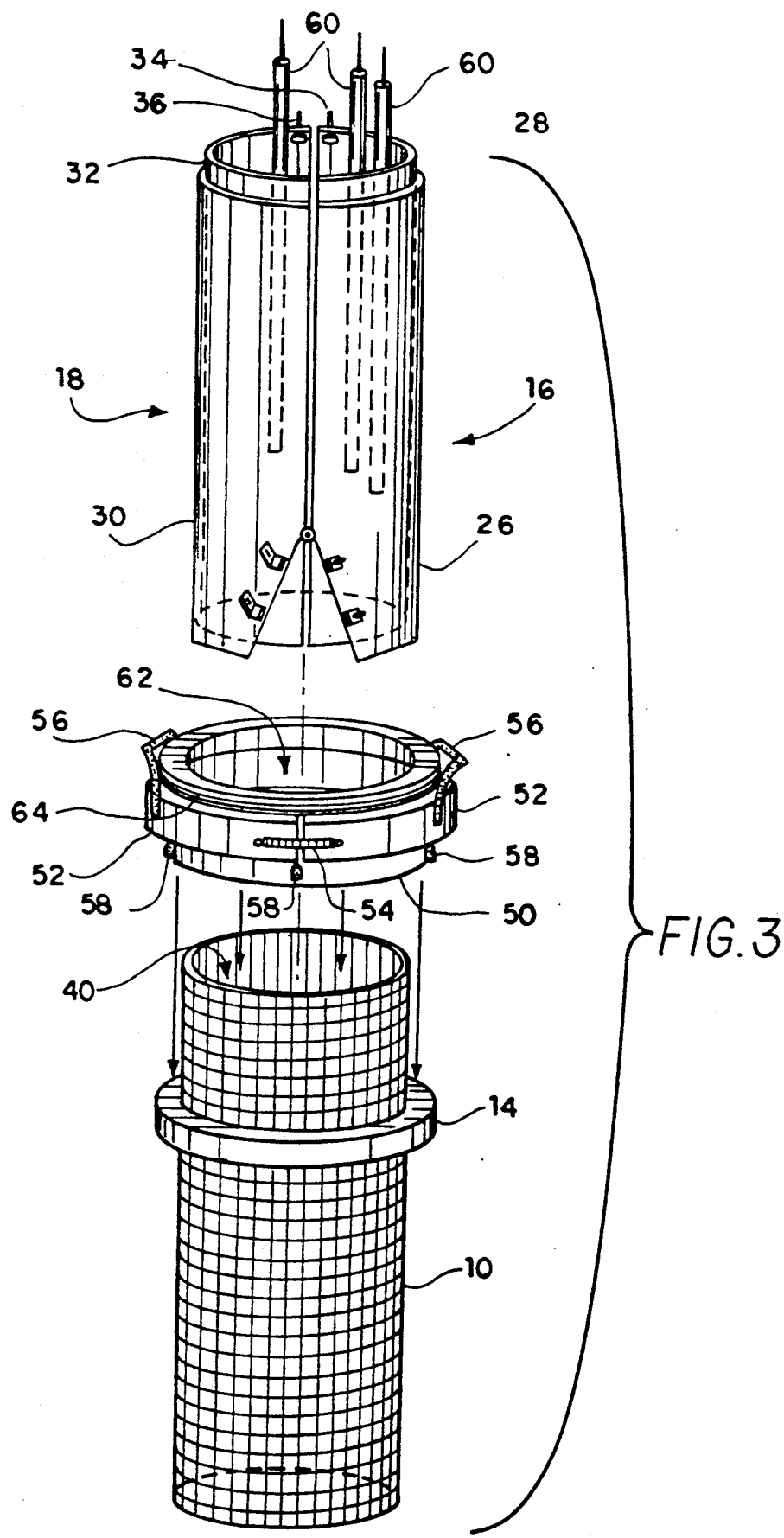
FIG. 3 is an exploded perspective view showing how the several parts of the leaf gathering and bagging device may be compactly stored when not in use.

FIG. 3 shows the manner in which the several parts of the leaf gathering and bagging device may be conveniently and compactly stored when not in use. As shown, bump ring 46 and integral cylindrical portion 50 carrying retainer ring 48 is placed so as to rest on bump ring 14 of basket 10. Legs 16 and 18 and removable tripod legs 60 can be stored within basket 10. Accordingly, the entire assembly takes up little more space than the basket 10 itself.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. A leaf gathering and bagging system comprising:

a leaf gathering device including a mesh basket means for collecting leaves and other debris, a first bump means mounted on said basket means, funnel means cooperating with said mesh basket means to guide said leaves and other debris into said mesh basket means, bag holder means for holding a bag means in position to cooperate with said mesh basket means to enable transfer of said collected leaves and other debris from said mesh basket means to said bag means said bag holder means including a second bump means engagable with said first bump means during transfer of said collected leaves and other debris from said mesh basket means to said bag means, said first bump means comprises a circumferential ring disposed externally of the mesh basket means near the top thereof, said funnel means comprises a pair of extendible legs having cover portions integral therewith, said cover portions being connectable by quick-release fastening means, said expandable legs being located in a V-configuration with the cover portions being located within said mesh basket means, said second bump means comprises a second circumferential ring having a cylindrical portion integral therewith and an opening configured to accept the top of said mesh basket means, said cylindrical portion including sockets for locating detachable tripod legs, said bag holder means further including a retainer ring means engagable with said cylindrical portion for holding said bag means in position to receive leaves and other debris from said mesh basket means, said retainer ring means comprises ring halves held together by spring means and spreadable means by grasping a handle on each ring half whereby said retainer ring means can be passed over the second circumferential bump ring to engage said cylindrical portion, said bag means overlapping said second circumferential bump ring to be clamped by said retainer ring means, each pair of extendible legs comprises telescoping upper and lower leg portions, the upper leg portions including said cover portions, the lower leg portions including spikes for holding said legs in position, whereby leaves and other debris can be blown into said mesh basket means by a blower means, and thereafter transferred to said bag means.

2. A leaf gathering and bagging system comprising:

a leaf gathering device including a mesh basket means for collecting leaves and other debris, a first bump means mounted on said basket means, funnel means cooperating with said mesh basket means to guide said leaves and other debris into said mesh basket means, bag holder means for holding a bag means in position to cooperate with said mesh basket means to enable transfer of said collected leaves and other debris from said mesh basket means to said bag means, said bag holder means including a second bump means engagable with said first bump means during transfer of said collected leaves and other debris from said mesh basket means to said bag means, said first bump means comprises a circumferential ring disposed externally of the mesh basket means near the top thereof, said funnel means comprises a pair of extendible legs having cover portions integral therewith, said cover portions being connectable by quick-release fastening means, said expandable legs being located in a V-configuration with the cover portions being located within said mesh basket means, said second bump means comprises a second circumferential ring having a cylindrical portion integral therewith and an opening configured to accept the top of said mesh basket means, said cylindrical portion including sockets for locating detachable tripod legs, said bag holder means further including a retainer ring means engagable with said cylindrical portion for holding said bag means in position to receive leaves and other debris from said mesh basket means, said retainer ring means comprises ring halves held together by spring means and spreadable means by grasping a handle on each ring half whereby said retainer ring means can be passed over the second circumferential bump ring to engage said cylindrical portion, said bag means overlapping said second circumferential bump ring to be clamped by said retainer ring means, each pair of extendible legs comprises telescoping upper and lower leg portions, the upper leg portions including said cover portions, the lower leg portions including spikes for holding said legs in position, the extendible legs are disengageable from each other, whereby the extendible legs and tripod legs may be stored within the mesh basket means, while the remainder of the bag holder means may be stored on the first bump ring, whereby leaves and other debris can be blown into said mesh basket means by a blower means, and thereafter transferred to said bag means.

* * * * *